Nov. 18, 1969  D. N. CROSTHWAIT, JR  3,478,625
TOOL FOR ADJUSTING VALVES

Filed Oct. 3, 1966  2 Sheets-Sheet 1

INVENTOR
D.N. CROSTHWAIT, JR.

By
Curtis, Morris & Safford
ATTORNEYS

Nov. 18, 1969  D. N. CROSTHWAIT, JR  3,478,625
TOOL FOR ADJUSTING VALVES

Filed Oct. 3, 1966  2 Sheets-Sheet 2

INVENTOR
D.N. CROSTHWAIT, JR
By
Curtis, Morris & Safford
ATTORNEYS

United States Patent Office 3,478,625
Patented Nov. 18, 1969

3,478,625
TOOL FOR ADJUSTING VALVES
David N. Crosthwait, Jr., Michigan City, Ind., assignor to Dunham-Bush, Inc., West Hartford, Conn., a corporation of Delaware
Filed Oct. 3, 1966, Ser. No. 583,539
Int. Cl. F16k 51/00, 29/00
U.S. Cl. 81—3     4 Claims

ABSTRACT OF THE DISCLOSURE

A setting tool for adjusting the control disc in the bonnet of a fluid valve comprising a tool stem carrying a handle at one end and a pair of lugs at the other end. A tool body is adjustably mounted on the tool stem intermediate the ends and is movable axially along the tool stem to register with indicia carried on the lower end of the tool stem to indicate the relative position of the tool body on the tool stem.

---

In forced water heating and cooling systems, load requirements vary from unit to unit according to the requirements of their locations, and performance varies from unit to unit according to the placement within the system. For example, in a cooling system a unit in a southerly exposed space far from a chiller has a large cooling load, and may tend to have a relatively low rate of delivery of cold water because of pressure loss by friction in the pipes and consequent preferance of water for closer units. A standard solution to the problem of uneven loads and distribution is to install balancing valves at each unit and at other points in the system. The valves are set at various positions between fully open and fully closed according to how much water is needed by each unit and how much pressure the water is under at the various units. Thus, in the above example, of a heavy load at a remote location, the valve for that unit would probably be nearly or completely open. The other valves in the system would be adjusted according to the requirements of the units with which they are associated. To balance an entire system, individual unit requirements must be studied, and valves have to be tediously and exactly adjusted. Often the time of a full week or more of an engineer is spent balancing a system.

The original installation of the system can be greatly simplified if standard tables on hot or cold water delivery in a pipe system and on the output of water heating or cooling apparatus are consulted and if heating or cooling requirements are calculated, and then the information is applied to preset exactly each of the balancing valves. The present invention allows very exact pre-adjustment of valves so that only minor empirical adjustments have to be made.

At various times in the operating life of a system, it is partially or fully shut down and one or more valves are closed. It is important to retain the precise setting of each valve so that upon resumption of normal operation the system can be restored to its balanced condition without expense and difficulty. The present invention allows exact reopening of all valves to their balanced positions by unskilled workers and without recording any data.

Figure 2:
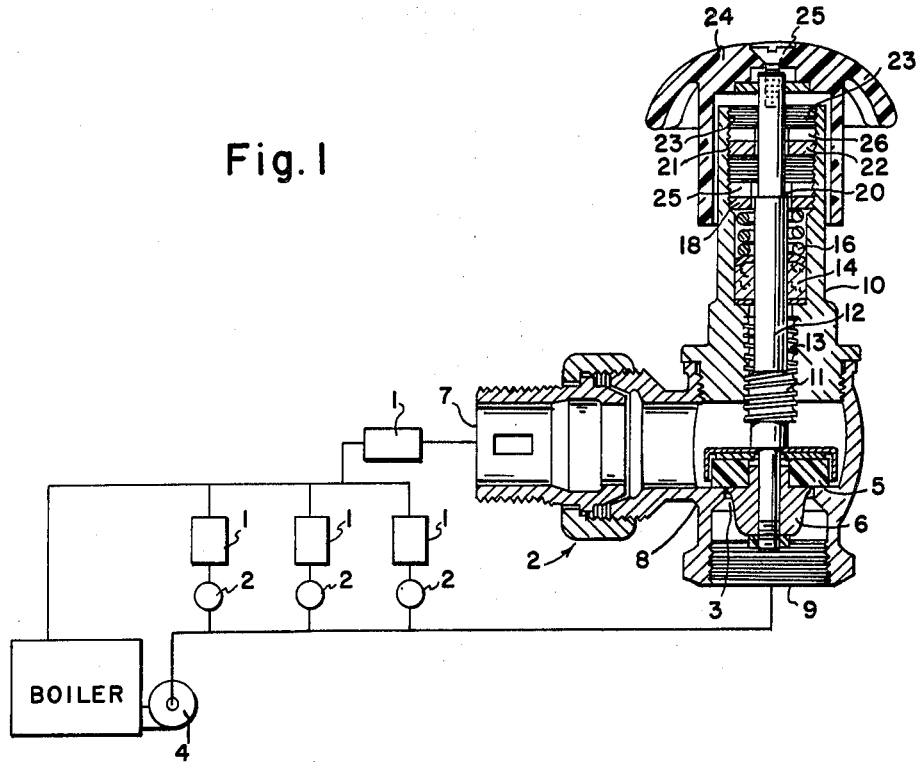
Figure 3:
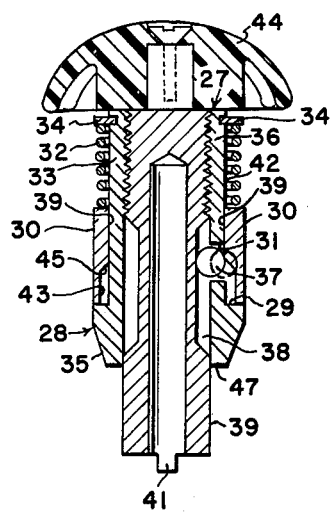
Figure 4:
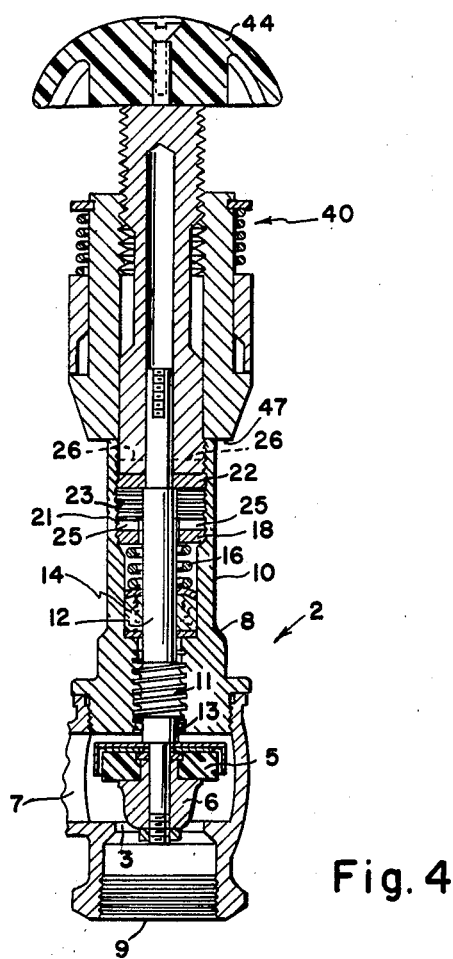

Referring to the drawings:
FIGURE 1 is a schematic representation of a heating system, constituting one embodiment of the invention and showing one of the balancing valves in section;
FIGURE 2 shows the adjusting tool for the valves of FIGURE 1;
FIGURE 3 is a view of the stem of the adjusting tool; and,
FIGURE 4 is a sectional view of the valve of FIGURE 1, with the adjusting tool inserted for adjusting the valve.

Referring to FIGURE 1 of the drawings, a hot water system has a boiler and a circulating pump 4 which circulates hot water to a number of valves 2, each of which controls the supplying of hot water to the heat exchange coil of a heating unit 1. Each of these valves may be opened and closed, and may be adjusted between its closed position and its fully opened position so as to provide a predetermined or specific flow of hot water to its unit. For purposes of understanding the invention, one of the valves 2 in FIGURE 1 is shown in section and will be described. The valve has a valve body 8 with standard inlet and outlet connections 9 and 7, respectively, interconnected by a valve port 3. A composition valve disc 5 is positioned above port 3 and may be moved to and from the seated position against the valve body wherein it closes the port. A control cone 6 is mounted beneath disc 5 within the port when the valve is closed. When the disc is moved upwardly away from the port, the control cone partially blocks the port and provides a predetermined restriction to the flow of fluid through the port. Hence, as disc 5 is moved progressively upwardly away from port 3, cone 6 provides for the increased flow through the port in accordance with a predetermined flow curve.

Integral with valve body 8 is a valve bonnet 10, with a central bore within which is positioned a valve stem 12 upon which disc 5 and cone 6 are mounted, a packing 14, a packing spring 16, a packing ring 18 and a threadably mounted control ring 22. A knob or handle 24 is mounted upon the top of valve stem 12 and is held in place by a screw 25. Rigidly mounted upon the valve stem is a threaded collar which has square threads 11 which are mated with threads 13 in the central bore of the valve body. Hence, when the valve stem 12 is turned by knob 24, the inter-engagement of threads 11 and 13 cause the valve stem to move axially. This axial movement of the stem moves disc 5 and cone 6 to and from the position shown, wherein the disc closes port 3. The interrelation of the parts is such that the turning of the stem produces a very gradual change in the rate of flow through port 3.

Valve stem 12 has an upper portion of reduced diameter, thus forming a shoulder 20. This upper portion extends through and turns freely in the control ring 22, while the lower portion is snugly received in packing 14. Control ring 22 has peripheral threads 21 which mate with internal threads 23 in the upper end of bonnet 10. Packing ring 18 is similarly threaded, and in assembly the packing ring is threaded into the bonnet and turned into place with a tool (not shown) which engages in a pair of slots 25. Control ring 22 is installed in a similar manner and is turned to an adjusted position with a tool to be described below which projects into a pair of slots 26. However, shoulder 20 on stem 12 is adapted to engage the bottom surface of control disc 22 as the stem moves upwardly during the opening of the valve. Hence, control ring 22 limits the maximum opening of the valve, depending upon the position of the control ring, and that controls the maximum rate at which fluid may flow through the valve.

Figure 2A:
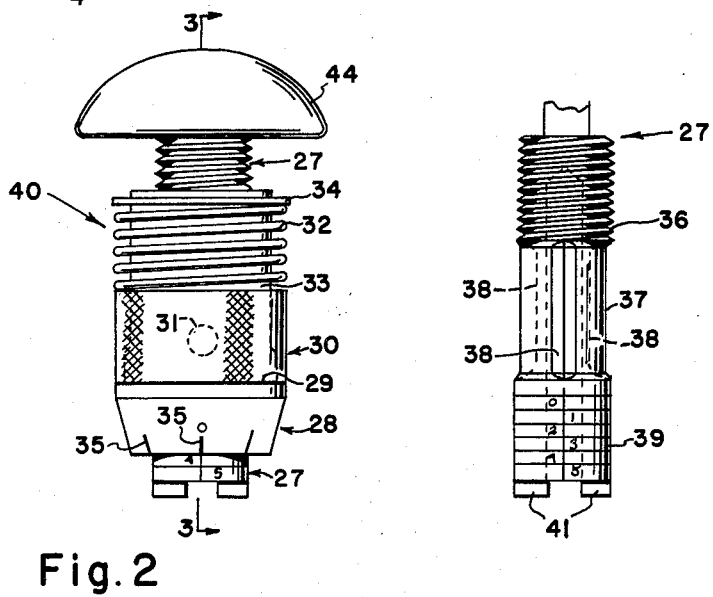

Referring to FIGURE 2, the adjusting tool 40 which is used to set or fix the position of control ring 22 in the valve body comprises: a tool stem 27 (see also FIGURE 2A); a handle or knob 44 mounted upon the top of the tool stem; a tool body 28; a sleeve 30 slidably mounted upon the tool body having a knurled outer surface; a spiral compression spring 32 mounted upon the tool body above sleeve 30; and a split ring spring-retaining clip 34. Tool stem 27 (FIGURE 2A) has threaded upper portion 36, a central cylindrical portion of reduced diameter 37 having four axial grooves 38 therein which are spaced 90° apart around the stem, a bottom cylindrical portion 39 which bears indicia, and a pair of diametrically-spaced rectangular lugs 41. Tool body 28 (see also FIGURE 3) has a main cylindrical portion 33 upon which sleeve 30 is slidably mounted and urged downwardly by spring 32. Clip 34 is positioned in an annular slot in the top of the tool body and holds the spring under compression. At the lower end of the tool body there is a tapered or frustoconical portion 35 which has a bottom annular surface 47 and has a diameter at the top larger than the diameter of the cylindrical portion 33 so as to form a shoulder 29 against which sleeve 30 is urged by spring 32. As shown best in the upper portion of FIGURE 3, the tool body has internal threads on its upper portion which mate with the threads on the upper portion 36 of the tool stem 27. Hence, the tool body may be moved axially up and down the tool stem by holding the tool stem stationary and turning the tool body.

The tool body has a hole 31 (shown at the right in FIGURE 3), and positioned within hole 31 is a steel ball 37 which is shown projecting into one of the grooves 38. The upper portion of sleeve 30 has an inner surface 39 which slides on the outer surface 42 of the tool body, but the lower portion of the sleeve has a larger inside diameter, so that the surface 43 is spaced radially outwardly from surface 42. Hence, when the sleeve is in the rest position shown, ball 37 has been pushed radially inwardly, and the diameter of the ball is substantially greater than the depth or axial dimension of hole 31, so that the ball must be positioned partially within one of the grooves 38. However, when sleeve 30 is moved upwardly against the action of spring 32, the lower portion of the sleeve is moved in alignment with ball 37 and the outward spacing of surface 43 permits the ball to move radially outwardly to the broken line position. Hence, when sleeve 30 is in the position shown, it holds ball 37 partially in the adjacent groove 38, and the ball then acts to prevent the tool body from turning on the tool stem. However, when sleeve 30 is slid upwardly so that surface 43 is in alignment with ball 37, the ball may move radially outwardly from groove 38, and the tool body may be turned on the tool stem. Hence, the tool body may be moved up and down on the tool by raising the sleeve and turning the tool body. The tool body may then be latched and held in a fixed position at the end of each quarter turn by merely releasing sleeve 30 so that the spring urges it downwardly, and the sleeve will project the ball into the next groove 38 which is encountered upon further turning of the tool body. The slanting surface 45 between surfaces 39 and 43 aids in pushing the ball outwardly.

Referring again to FIGURE 2, the lower end of tool stem 27 bears indicia in the form of annular lines which are numbered from 0 to 5, respectively. The frusto-conical surface on the lower portion of the tool body has vertical lines 35 which aid in providing a specific "set" position of the tool body axially of the tool stem.

Referring again to FIGURE 3, when it is desirable to set the control ring 22 in a valve 2, the tool body is set on the valve stem to the appropriate numbered line, or to one of the quarter-turn intermediate positions. The valve handle or knob is then removed from the valve, and the tool is positioned in the top of the valve, as shown in FIGURE 3. Assuming that the control ring is near the top of the valve bonnet, the lugs 24 are nested into the slots 26 in the control ring, and the tool is turned clockwise until the bottom annular surface 47 of the tool body rests upon the top of the valve bonnet. The tool is then withdrawn, and the valve handle 24 is put back in place. If the control ring 22 is to be moved upwardly to effect the setting, that may be done by first turning the control ring to the top of the bonnet with the same wrench or tool which is used to install the packing ring 18, or with tool 40 when the tool body is in the zero position, and the adjustment may then be made as described above.

Tool 40 may also be used to determine the setting of a valve as follows: The tool body is adjusted to the 0 position, and the tool stem is inserted in the top of the valve as explained above. The tool is held stationary, and the operator reads the setting which is the indicia reading on the tool stem at the top of the valve bonnet. Alternatively, the tool may be held stationary with the stem positioned in the valve, and the tool body is then turned to the position where its bottom surface 47 rests upon the top of the valve bonnet, as shown in FIGURE 4. The tool is then removed, and the reading made at surface 47.

Another example of the installation and balancing of the system of FIGURE 1 is when the valves are to be set in accordance with the calculated heat loads. Each of the valves is fully closed when installed, and its control ring 22 is at or near the top of its valve bonnet. In setting each valve, the operator removes the handle 24 and adjusts the tool 40 to the calculated setting for that valve by turning the tool body so that surface 47 is at the corresponding position on the indicia of the bottom of the tool stem. The tool is then inserted into the top of the valve bonnet, with the lugs 41 nested in the slots in the control ring. The tool is turned, thus turning the control ring downwardly in the bonnet until surface 47 is flush with the top of the valve bonnet. The tool is then removed, and the handle 24 is replaced. When all of the valves have thus been set, the system is balanced, and the valves may be closed and opened without the necessity for rebalancing. In accordance with another procedure for installing the system of FIGURE 1, the valves may be preset prior to installation and then installed in accordance with a coded or numbered system. That procedure facilitates the setting of the various valves and makes it unnecessary to go throughout the building to balance the system.

The present invention represents a simplified and efficient mode of balancing heating and cooling systems, and yet it permits the occupants and the operator with the opportunity to close the various valves so as to discontinue the heating or cooling operation. Installation costs are reduced, and the setting of each of the valves is foolproof, in that the special tool must be positioned so that the occupants cannot interfere with the proper operation of the system. The system also provides for the predetermination of the proper settings of the various valves and the accurate setting of each of the valves prior to placing the system into operation. The system may be used with baseboard heating, convectors, fin coil units and ventilators.

What is claimed is:

1. A setting tool which is adapted to engage and turn a control disc in the bonnet of a fluid valve comprising, a tool stem having an end portion which is adapted to be received in the valve bonnet and having lugs thereon which are received by recesses in the control disc thereby to provide for the turning of the disc by the tool, a tool body surrounding the upper portion of said tool stem and threadably mounted to be moved axially thereof by rotation with respect thereto, said tool body having a lower edge beneath which said end of said tool stem is exposed, said end of said tool stem bearing indicia indicating the relative position of said tool body upon said tool stem, and handle means to turn said tool stem.

2. A tool as described in claim 1 which includes releasable latch means which may prevent the turning of said tool body upon said tool stem.

3. A tool as described in claim 2 wherein said tool body has an opening through its side wall, and wherein said latch means comprises a sleeve surrounding a portion of said tool at said opening and movably mounted thereon, and a ball within said sleeve and positioned in said opening between said sleeve and said tool stem, said tool stem having a portion within said sleeve adapted to cooperate with said ball to lock together said tool body and said tool stem, said sleeve having internal means which is adapted to be moved between a latching position wherein said ball is urged by said sleeve toward said tool stem and a releasing position wherein said ball may move radially outwardly away from said tool stem.

4. A tool as described in claim 3 wherein said sleeve is movable axially, and which includes a coil spring surrounding the upper portion of said tool body and resiliently urging said sleeve toward said latching position.

References Cited

UNITED STATES PATENTS

| | | | |
|---|---|---|---|
| 1,517,176 | 11/1924 | Shepperd | 81—90 |
| 1,556,224 | 10/1925 | Klotz | 137—327 |
| 1,675,992 | 7/1928 | Sherman | 137—327 X |
| 1,746,381 | 2/1930 | Davis. | |
| 3,139,262 | 6/1964 | Morris et al. | 251—210 X |

ROBERT C. RIORDON, Primary Examiner

R. V. PARKER, Jr., Assistant Examiner

U.S. Cl. X.R.

251—210; 137—327